Oct. 13, 1936.  J. R. GAMMETER  2,057,021

HOT KNIFE AND METHOD OF USE

Filed Dec. 1, 1934  7 Sheets-Sheet 1

INVENTOR
JOHN R. GAMMETER
BY Albert L. Ely
ATTORNEY

Oct. 13, 1936.  J. R. GAMMETER  2,057,021
HOT KNIFE AND METHOD OF USE
Filed Dec. 1, 1934  7 Sheets-Sheet 6

INVENTOR
JOHN R. GAMMETER
By Albert L. Ely
ATTORNEY

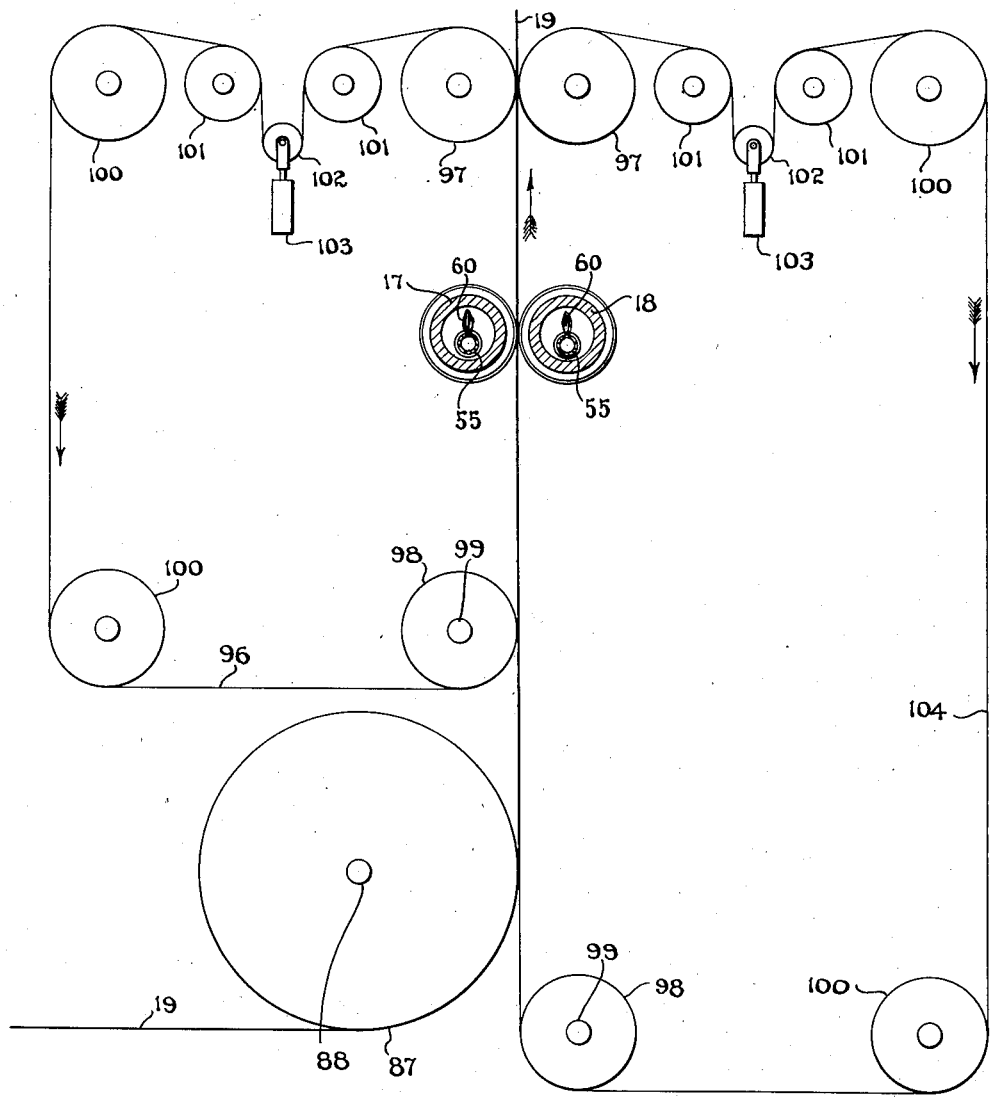

Patented Oct. 13, 1936

2,057,021

UNITED STATES PATENT OFFICE 2,057,021

HOT KNIFE AND METHOD OF USE

John R. Gammeter, Akron, Ohio, assignor to United States Rubber Company, New York, N. Y., a corporation of New Jersey Application December 1, 1934, Serial No. 755,598

15 Claims. (Cl. 18—2)

This invention relates to a method and apparatus for producing thread rubber from liquid latex or other rubber dispersions and has for its primary object a simplified method and improved thread rubber produced in an efficient and inexpensive manner.

A further object of the invention is to produce thread rubber in a continuous length from a sheet or band of rubber material applied to a resistible traveling belt or similar surface.

A further object of the invention resides in separating the sheet or band of rubber material into a plurality of individual, continuous threads by the application of heat to the traveling sheet or band of rubber material.

A still further object of the invention is to provide means for maintaining the threads of the severed sheet or band in predetermined relation and simultaneously to prevent the rubber threads from adhering to the separating means.

With the objects above indicated and other objects hereinafter explained in view, the invention consists in the construction, combinations of elements and method as hereinafter described and claimed.

Referring to the drawings,

Figure 7 is a diagrammatic, elevational view showing the means for maintaining the thread of the severed sheet in predetermined relation.

Figure 1:
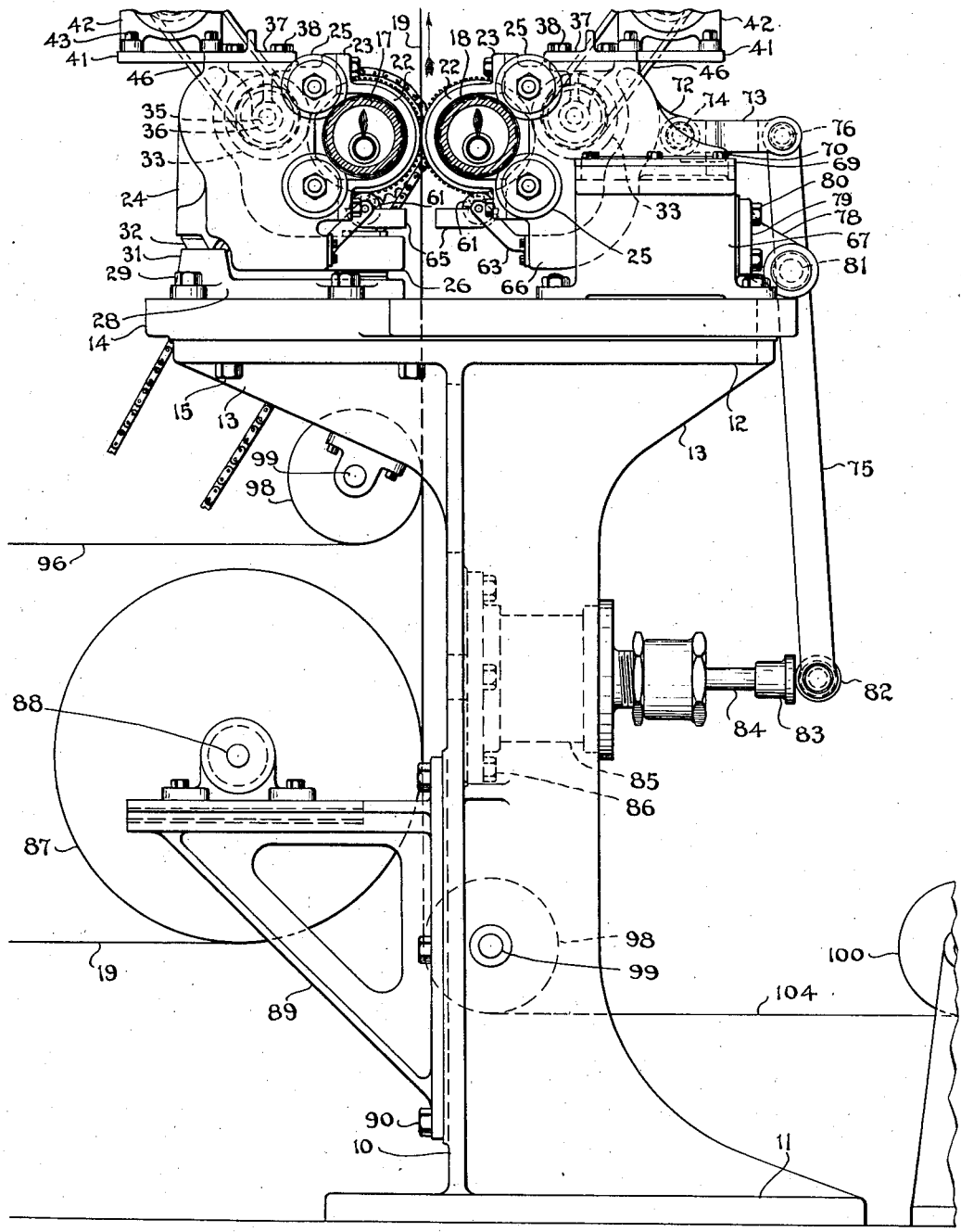
Figure 1 is a side elevational view of an apparatus embodying the present invention, a portion thereof being in section to more clearly illustrate the details of construction.

In the drawings, 10 indicates a pedestal preferably made of cast iron and having a base 11 formed integral whereby the pedestal may be supported upon any desirable supporting structure and secured in any suitable manner. A horizontally disposed top member or plate 12 is formed integral with the upper end of the pedestal 10 and is reinforced by spaced webs 13 in the usual manner.

A base plate 14 of cast iron is horizontally disposed and of somewhat greater size than the top member 12, being detachably secured to the latter by a plurality of bolts 15 so as to provide a rigid structure. On one side, the right hand as viewed in Figure 3, the base plate 14 is provided with a plurality of T slots 16 extending inwardly any suitable distance and spaced in parallelism for a purpose to be later described.

Figure 6:
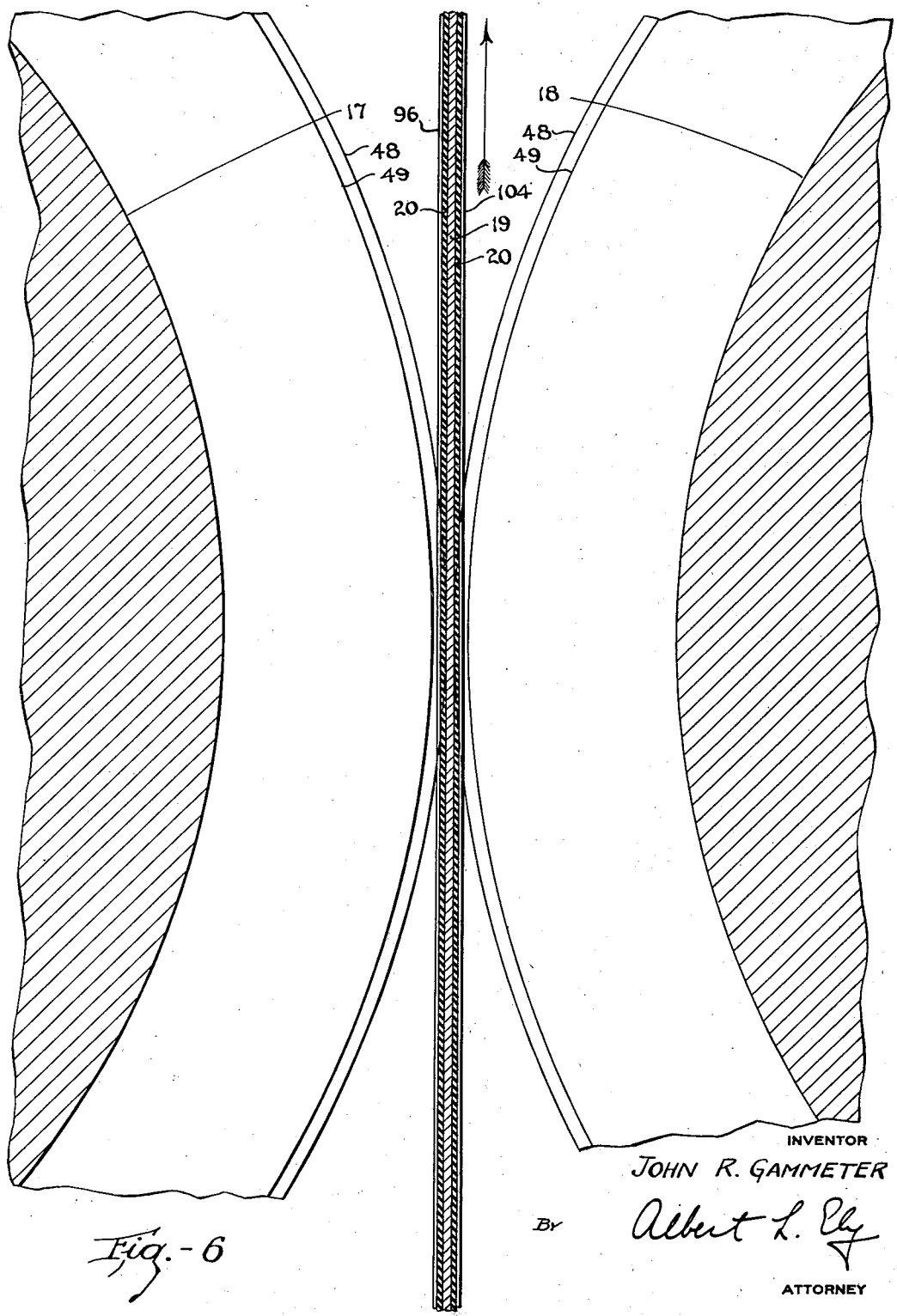
Figure 6 is a fragmentary, elevational, sectional view make upon an enlarged scale to more clearly illustrate the construction.

A pair of cooperating mandrels 17 and 18 are positioned transversely of the base plate 14 and upon opposite sides of a vertically traveling metal belt 19 upon which the rubber material 20 is deposited either on one or both sides as may be desired as more clearly shown in Figure 6. The mandrel 17 is of tubular construction and has a pair of spaced circumferential grooves 21 upon each end thereof. Straps 22 have portions extending about the ends of the mandrel 17 between each pair of grooves 21 and have laterally extending flanges 23 connected by bolts 23ª to a frame 24. Pairs of ball bearing rollers 25 are rotatably mounted upon opposite sides of the frame 24 and are disposed in the grooves 21 on the side opposite to said straps, thereby rotatably supporting said mandrel above and below the horizontal axes thereof as more clearly shown in Figure 3. The frame 24 has an inwardly extending portion 26 provided with an opening at its inner end in which a bushing 27 is secured. A plate 28 is secured to the upper surface of the base plate 14 by bolts 29 and has a screw-threaded opening which receives the screw-threaded end of a bolt 30 extending through the bushing 27 and about which the frame 24 is movable and may be secured in proper position to align the mandrels 17 and 18. An arcuate rib 31 is formed upon the upper side of the plate 28 at the outer portion thereof and is engaged by a similar depending rib 32 formed at the outer portion of the frame 24 and by which the latter is supported.

A metal brush 33 is secured by nuts 34 to a transversely extending shaft 35, the opposite ends of which are journaled in bearings 36. A plate 37 extends across the upper portion of the frame 24 and is secured at its opposite ends to the frame by bolts 38 in a manner to permit transverse adjustment. The bearings 36 are secured to the under side of the plate 37 by bolts 39 so as to be movable therewith. The adjustability of the plate 37 affords means by which the brush 33 may be relatively positioned with respect to the mandrel 17 for a purpose to be later described.

The plate 37 has an integral rib 40 extending longitudinally thereof for reinforcement and at one end thereof an integral, outward extension 41 is provided. A motor 42 of any desirable type is supported upon the extension 41 and secured thereto by bolts 43. The motor has a shaft extension on which a groove pulley 44 is secured. The adjacent end of the shaft 35 also has a grooved pulley 45 secured thereto and in alignment with the pulley 44, both being connected by an endless belt 46 which provides a positive drive for rotating the brush 33.

The mandrel 17 has spaced, exteriorly screw-threaded portions 47 between which are arranged a plurality of circular knives 48 and intermediate spacers 49, the latter being of any desired thickness depending upon the gauge or size of thread rubber required. Sufficient clearance is provided between the knives and spacers and the outer surface of the mandrel to permit slight endwise movement for adjustment. Washers 50 are positioned at the outer ends of the knives 48 and have pins 51 secured therein, the outer ends of which are disposed in slots 52 provided in the adjacent sides of the mandrel 17 so as to prevent relative rotation but to permit endwise adjustment. Screw-threaded nuts 53 cooperate with the screw-threaded portions 47 on the mandrel and engage the washers 50. Circumferentially spaced openings 54 are provided in the nuts 53 to receive a suitable wrench by which they may be adjusted to clamp the knives and spacers in rigid relation. This construction also permits replacing any of the knives in the event of injury or to substitute a different size spacer to produce a different size thread. This construction is more clearly shown in Figure 5.

Figure 2:
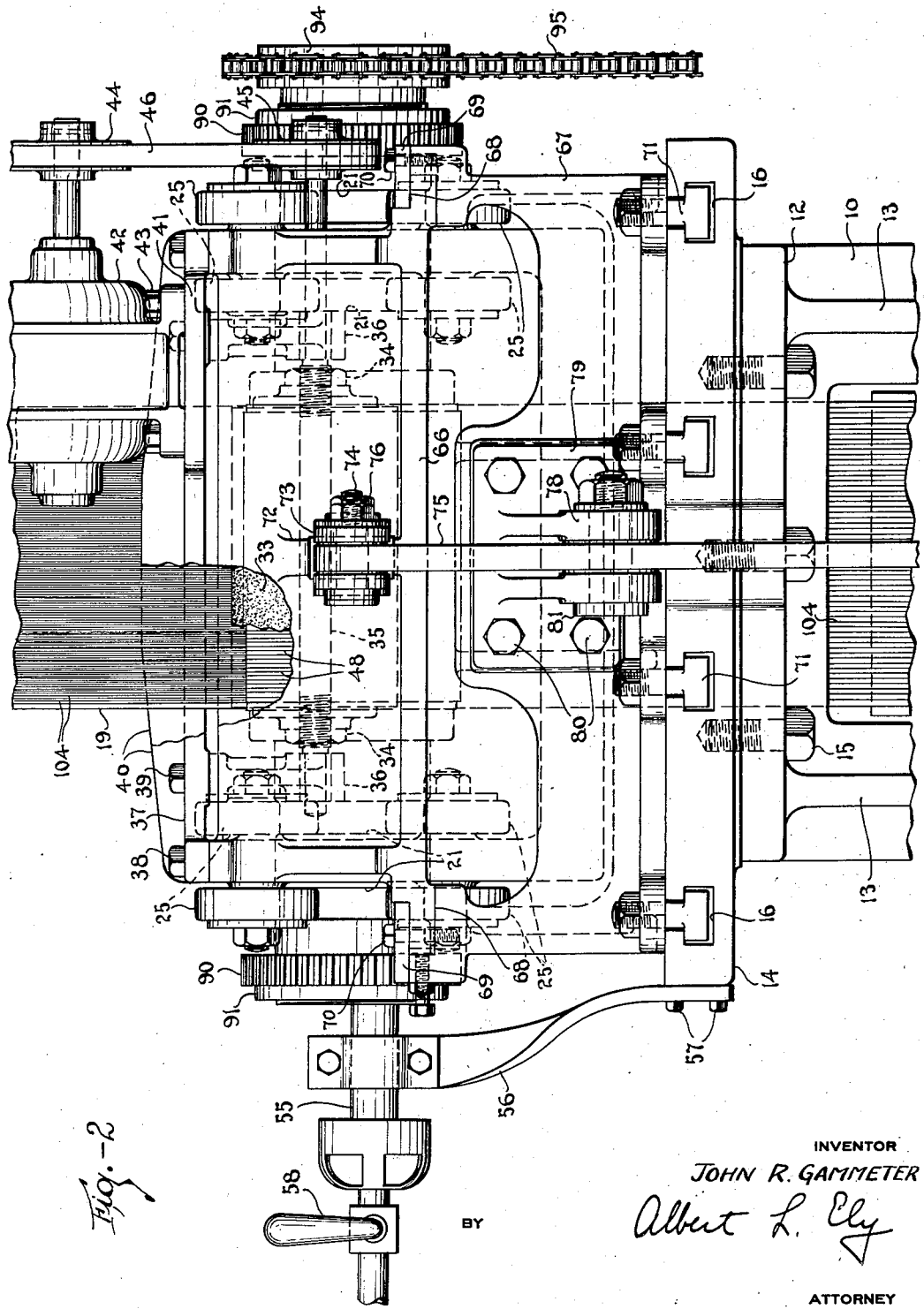
Figure 2 is an end elevational view of the upper portion of the apparatus made upon an enlarged scale.

Heat may be applied to the knives 48 in any suitable manner, but preferably by reason of the fact that the mandrel is hollow affords a ready application. In the present instance, a burner 55 extends longitudinally within the mandrel and one end projects therebeyond and is supported by a strap iron bracket 56 having its lower end connected to the base plate 14 by bolts 57 as clearly shown in Figure 2. A mixer and valve 58 is provided to control the flow of gas to the burner in any well-known manner. The burner 55 has ports 59 whereby the gas may be ignited and the flames 60 play upon the inner periphery of the mandrel heating the same which in turn transmits the heat to the knives 48. The knives may be heated to any desired temperature for the purpose intended, but it has been found that a temperature from 200° to 300° F. is sufficient and should be controlled by thermostatic means in any well-known manner.

While gas is here shown for the purpose of supplying heat to the knives, it should be understood, of course, that any other means may be employed such as steam, electricity, etc.

Figure 3:
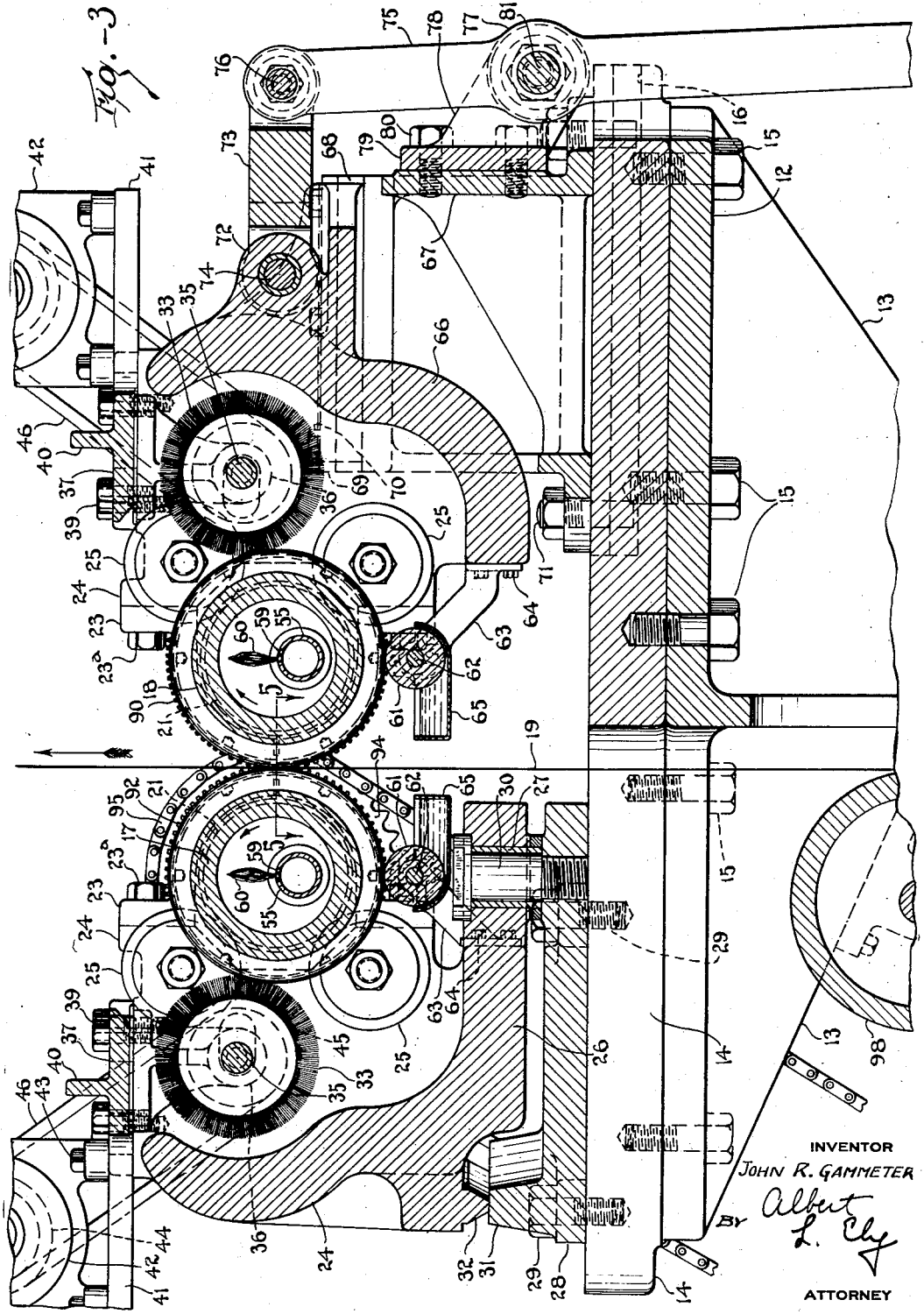
Figure 3 is a vertical, sectional view taken on line 3—3 of Figure 4.
Figure 4:
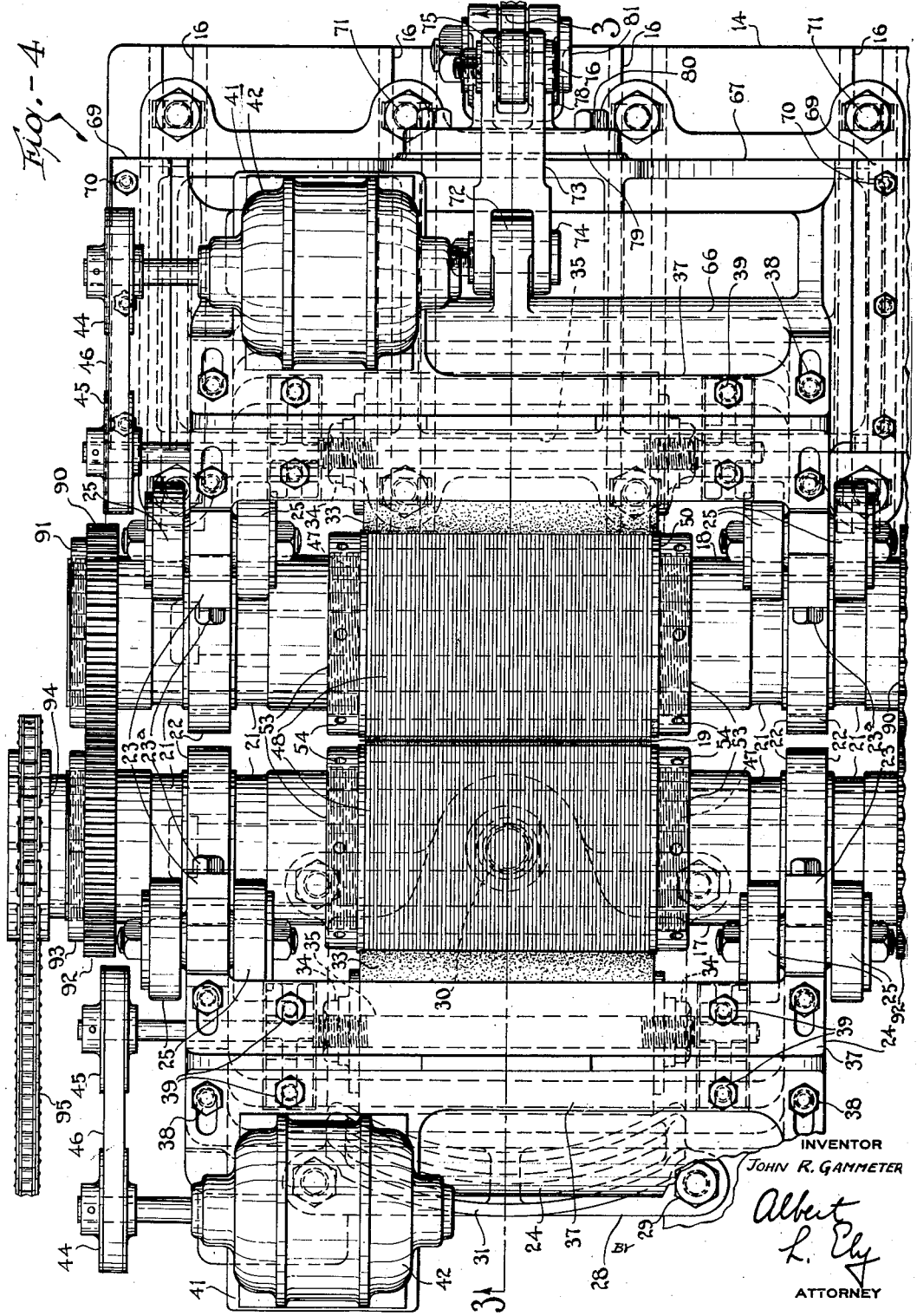
Figure 4 is a top plan view of the apparatus shown in Figure 1, but made upon an enlarged scale.

Due to the characteristics of the rubber material used there is a tendency for the cut threads to stick together and this may be prevented by dusting the sheet with talc either before or after the separating operation or, as shown in the drawings, a felt roller 61 is secured to a rod 62 having its outer ends rotatably journaled in a bracket 63 connected to the frame 24 by bolts 64. A receptacle 65 is secured to the bracket 63 and positioned beneath the roller 61 as shown in Figure 3. The roller 61 contacts with the knives 48 on the mandrel 17 and is rotated by frictional engagement therewith. A suitable coagulant is placed in the receptacle 65 and the roller 61 being partly submerged therein transfers the coagulant to the knives 48 just prior to their engagement with the rubber material upon the belt 19. As the knives separate the rubber material into threads the coagulant is applied to adjacent edges thereof which acts to prevent coherence between adjacent threads.

Inasmuch as the mandrel 18 is supported and operates in precisely the same manner as the mandrel 17 heretofore described, it will not be necessary to further elaborate thereon except insofar as the following differences are concerned.

The mandrel 18 is supported on a frame 66 similar to the frame 24, but in this instance the frame 66 is slidably mounted upon the upper side of a support 67, there being provided for this purpose cooperating slideway 68 at the opposite sides thereof. Plates 69 extend over the adjacent ends of the frame 66 and are secured by bolts 70 to the upper side of the support 67 so as to prevent accidental disengagement, but at the same time to permit free sliding movement of the frame 66. The support 67 is secured to the upper surface of the plate 14 by bolts 71 having T-shaped heads which are slidably disposed in the T-shaped grooves 16 to permit adjustment of the support 67. This construction permits the mandrel 18 to be moved toward the mandrel 17 so that the knives 48 will sever the rubber material deposited upon the belt 19 and to be moved into inoperative position with the knives 48 out of cooperative engagement.

The frame 66 may be moved manually or otherwise, but in the present instance a power actuated device operates to move the mandrel 18 into operative position but is moved to inoperative position by hand. At the outer side of the frame 66 is an extension 72 having an opening therethrough and is disposed in one of the bifurcated ends of a link 73 also provided with aligned openings to receive a bolt 74. The opposite bifurcated end of the link 73 also has aligned openings and receives the upper end of a lever 75 also provided with an opening to receive a bolt 76. Intermediate the ends of the lever 75 is a bossed portion 77 having an opening therethrough and which is positioned between a pair of ears or extensions 78 formed integral with a bracket 79. The bracket 79 is secured to the adjacent side of the support 67 by bolts 80, the lever 75 being pivotally mounted upon a bolt 81 passing through aligned openings in the ears 78.

The lower end of the lever 75 has a roller 82 pivotally mounted thereon which is adapted to engage a head 83 on the outer end of a piston rod 84, the piston being mounted in a cylinder 85 in any well-known manner. The cylinder 85 is secured by bolts 86 to the pedestal 10 and the interior of the cylinder may be connected with any suitable source of compressed air or other fluid under pressure by means (not shown) whereby the piston is moved to exert an outward pressure on the end of the lever 75 in turn causing the mandrel 18 and knives to be moved into operating position. Any suitable means may be employed for controlling the supply to the cylinder. While a one-way power operation is illustrated, it should be understood that power may be employed to move lever 75 in both directions.

It has been found that a pressure of approximately 2½ to 3 pounds per knife is sufficient to sever the rubber material, but this, of course, may be varied to suit the conditions encountered. The means illustrated is well adapted to operate the knives 48 with any desired pressure by regulating the pressure of the air or other fluid within the cylinder 85.

The metal belt 19 may be guided upwardly into proper position between the members 17 and 18 by providing a sheave 87 rotatably journaled in bearings 88 secured to a bracket 89 which in turn is bolted at 90 to the pedestal 10 upon the opposite side from the cylinder 85. The metal belt 19 may further be trained over similar sheaves leading to and from a rubber material depositing station at any desirable location as well as through drying and vulcanizing stations in a manner well-known to those skilled in the art, all in a continuous manner and similar to that described in copending application Serial No. 665,761, filed April 12, 1933.

While two sets of knives 48 are shown by which the sheet rubber material may be separated into threads upon opposite sides of the belt 19 simultaneously, it should be understood that the rubber material may be applied to one side only and threads formed therefrom. In this latter instance only one set of knives are required adjacent the side of the belt upon which the rubber material has been applied and an ordinary backing roll substituted for the other set of knives to merely afford resistance when the knives are moved into operating position.

It is, of course, essential that the mandrels 17 and 18 carrying the knives 48 rotate at the same speed as the travel of the belt 19 so that there is no tendency to sever or tear the sheets of material while being formed into threads. Of course it is much better that the knives 48 of both mandrels align transversely as one then acts as an abutment for the other during the thread-forming operation as more clearly shown in Figure 5. Also the threads may be formed square or with clean, sharp edges and of solid section.

On the opposite ends of the mandrel 18, external gears 90 are mounted and are secured in place thereon by nuts 91 having screw-threaded engagement with the mandrel. The mandrel 17 has, in a similar manner, external gears 92 mounted thereon and are secured in place by nuts 93 having screw-threaded engagement with the mandrel. The gears 92 are positioned so as to mesh with the gears 90 on the mandrel 17 so that both mandrels and their knives will be rotated at the same speed.

Either mandrel may, but as shown in the drawings the mandrel 17, have an extension on one end upon which is secured a sprocket 94 which receives an endless chain 95, the latter being connected in any suitable manner to the power source which drives the metal belt 19. This arrangement makes certain that the mandrels and their knives are positively rotated at the same peripheral speed and at the same longitudinal speed as the belt 19 during the thread-forming operation.

If it is desired to positively eliminate any tendency of the adjacent severed threads to stick to each other or to prevent the threads from sticking between the knives or to insure that the threads adhere to the belt, one type of suitable apparatus is shown in Figure 7 which may be employed.

Figure 5:
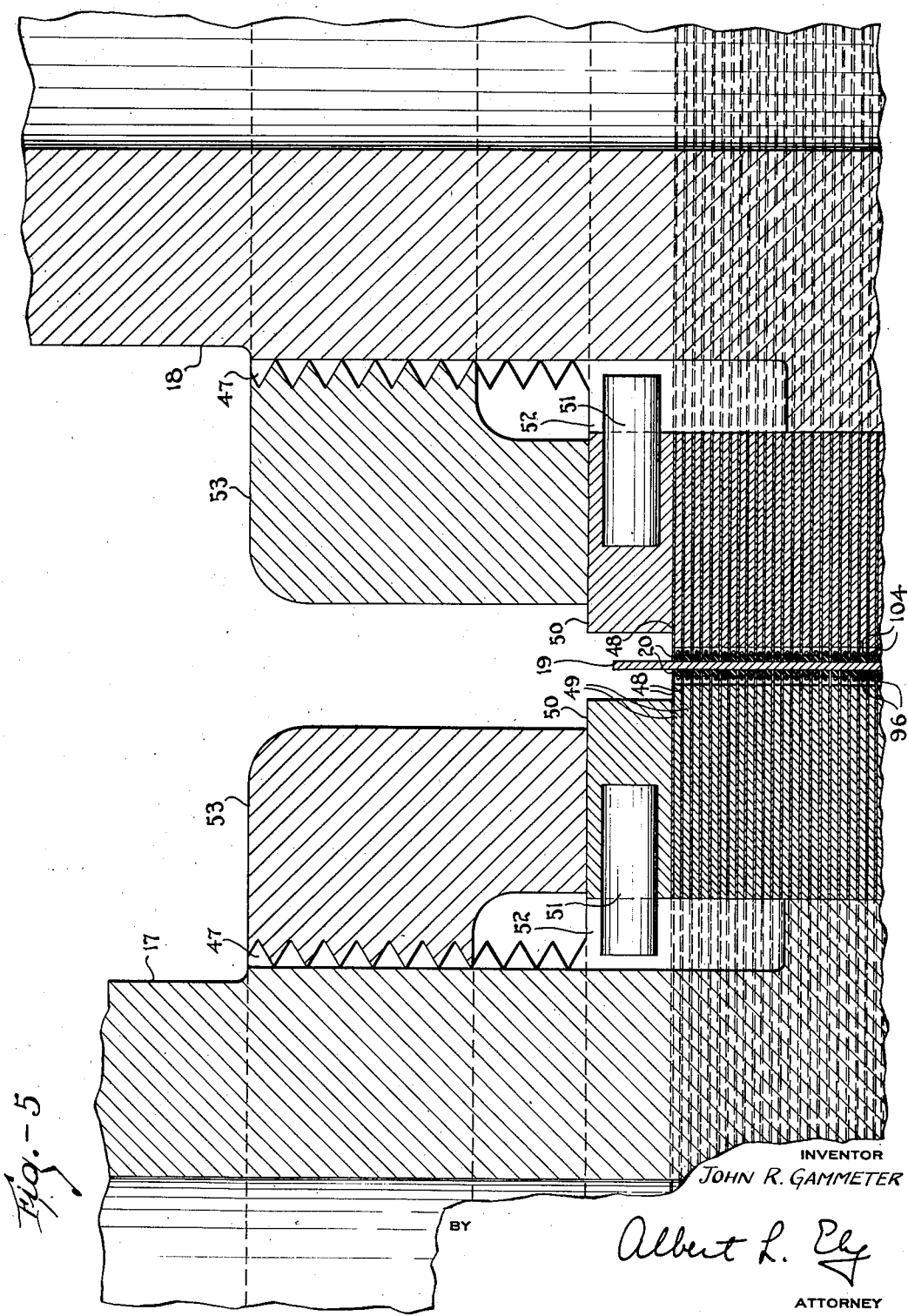
Figure 5 is a fragmentary, sectional view taken on line 5—5 of Figure 3 and made upon an enlarged scale to more clearly illustrate the construction.

A plurality of individual, endless coils 96 of wire of suitable gauge extend upwardly in parallelism with the belt 19 and are disposed between the adjacent knives 48 on the mandrel 17 in contact with the rubber material as more clearly shown in Figure 5. The number of coils 96, of course, corresponds with the number of threads being produced and the coils may extend around a transversely grooved sheave 97 above the machine and a similar transversely grooved sheave 98 rotatably mounted in bearings 99 bolted or otherwise secured to pedestal 10 as shown in Figure 1. These sheaves 97 and 98 are positioned in parallelism above and below the mandrels with the grooves corresponding to the spacing between the knives 48. Similarly grooved sheaves 100 may be supported in any suitable manner so as to support and guide the coils in their travel in the direction of movement of the belt and by frictional contact with the rubber material thereon.

Idler sheaves 101 also similarly grooved are rotatably supported between the upper sheaves 97 and 100 and the coils 96 are looped therebetween and extend around a grooved roller 102 to which an adjustable and detachable weight 103 is connected to take up the slack in the coils and thereby maintain that portion of the coils which contact with the rubber material and thread in parallelism.

An identical arrangement for the endless coils 104 associated with the mandrel 18 is provided and therefore needs no further explanation.

Briefly the operation is as follows. With the mandrel 18 slightly spaced from the mandrel 17 in inoperative position, the mandrel 17, if found to be out of parallelism with the belt 19, may be adjusted in the manner described and secured in adjusted position. The main drive for the belt 19 is then started with the result that the mandrels 17 and 18 are positively rotated at the same speed as the travel of the belt. The burners 55, having been lighted, heat the mandrels and knives carried thereby to the proper temperature and this temperature is automatically maintained.

The rubber material applied to the belt 19 is then being moved toward the knives 48 and the mandrel 18 is then moved toward the mandrel 17 to bring the knives 48 into contact with the rubber material on the belt. The heated knives separate the rubber material into threads during the upward travel of the belt and the piston in the cylinder 85 is moved outwardly by the admitted air to move the frame 67 carrying the mandrel 18 and knives into contact with the rubber material and to maintain the required pressure thereon.

Inasmuch as the mandrels and belt rotate and travel respectively at the same surface speed continuously, the rubber material is separated into threads continuously and without any shearing action. During the rotation of the mandrels coagulant is applied to the knives by means of the rollers 61 just prior to their engagement with the rubber material which results in coagulating the edges of adjacent threads to prevent sticking. The brushes 33 may be rotated by means of the motors 42 and by their contact with the knives the latter are continuously cleaned. After the threads have been produced they may remain on the belt and be cured or they may be stripped therefrom and subsequently cured.

If it is found that the threads tend to stick between adjacent knives or pull loose from the belt, the coiled wire apparatus may be used in the manner heretofore described.

While the apparatus is designed especially for dipping and applying latex or rubber dispersions to the belt 19, it should also be understood that any suitable rubber material may be spread or otherwise applied to the belt on one or both sides thereof.

While I have described the preferred embodiment of the invention, it should be understood that I am not to be limited thereto inasmuch as changes and modifications may be resorted to without departing from the spirit of the invention as defined in the appended claims.

What is claimed is:

1. In an apparatus for forming rubber threads and the like, a continuously moving belt for conveying rubber material in sheet form, a backing means on one side of said belt and engageable therewith, a plurality of spaced knives rotatably mounted on the other side of said belt and adapted to engage the rubber material, means for heating said knives to a temperature sufficient to sever the rubber material, and compressed air means for yieldingly moving said knives into and out of engagement with the rubber material and for maintaining a predetermined pressure thereon.

2. In an apparatus for forming rubber threads and the like, a continuously traveling belt adapted to convey rubber material on both sides thereof in sheet form, relatively movable cooperating severing means between which said belt passes and adapted to engage the rubber material on adjacent sides of said belt, means for heating said severing means to a temperature sufficient to sever the rubber material, and means for relatively moving said severing means into and out of engagement with the rubber material on said belt.

3. In an apparatus for forming rubber threads and the like, a continuously traveling belt adapted to convey rubber material on both sides thereof in sheet form, relatively movable cooperating knives rotatably mounted on opposite sides of said belt and adapted to engage the rubber material on the adjacent side of said belt, means for rotating said knives at the same peripheral speed as the lineal speed of said belt, means for heating said knives to a temperature sufficient to sever the rubber material, and means for relatively moving said knives into and out of engagement with the rubber material on said belt.

4. In an apparatus for forming rubber threads and the like, a continuously traveling belt adapted to convey rubber material on both sides thereof in sheet form, relatively movable cooperating knives rotatably mounted on opposite sides of said belt and adapted to engage the rubber material on the adjacent side of said belt, means for rotating said knives at the same peripheral speed as the lineal speed of said belt, means for heating said knives to a temperature sufficient to sever the rubber material, and means for moving said knives relatively to engage the rubber material on said belt and to maintain a predetermined pressure thereon.

5. In an apparatus for forming rubber threads and the like, a continuously traveling belt adapted to convey rubber material on both sides thereof in sheet form, a set of axially spaced knives rotatably mounted on one side of said belt and adapted to engage the rubber material on the adjacent side of said belt, a second set of axially spaced knives rotatably mounted on the opposite side of said belt and adapted to engage the rubber material on the adjacent side of said belt, means for rotating said sets of knives, and means for heating said sets of knives to a temperature sufficient to sever the rubber material.

6. In an apparatus for forming rubber threads and the like, a continuously traveling belt adapted to convey rubber material on both sides thereof in sheet form, a set of axially spaced knives rotatably mounted on one side of said belt and adapted to engage the rubber material on the adjacent side of said belt, a second set of axially spaced knives rotatably mounted on the opposite side of said belt and adapted to engage the rubber material on the adjacent side of said belt, one of said sets of knives being adjustable transversely of its axis of rotation and the other set of knives being movable toward and away from said first set of knives, means for rotating said sets of knives, means for heating said sets of knives to a temperature sufficient to sever the rubber material, and means for moving said movable set of knives into and out of engagement with the rubber material on the adjacent side of said belt.

7. In an apparatus for forming rubber threads and the like, a continuously traveling belt adapted to convey rubber material on both sides thereof in sheet form, a set of axially spaced knives rotatably mounted on one side of said belt and adapted to engage the rubber material on the adjacent side of said belt, a second set of axially spaced knives rotatably mounted on the opposite side of said belt and adapted to engage the rubber material on the adjacent side of said belt, means for rotating said sets of knives in unison and at the same peripheral speed as the lineal speed of said belt, and means for heating said sets of knives to a temperature sufficient to sever the rubber material.

8. In an apparatus for forming rubber threads and the like, a continuously traveling belt adapted to convey rubber material on both sides thereof in sheet form, a set of axially spaced knives rotatably mounted on one side of said belt and adapted to engage the rubber material on the adjacent side of said belt, a second set of axially spaced knives rotatably mounted on the opposite side of said belt and adapted to engage the rubber material on the adjacent side of said belt, means for rotating said sets of knives in unison and at the same peripheral speed as the lineal speed of said belt, means for heating said sets of knives to a temperature sufficient to sever the rubber material, and means for moving one set of knives into and out of engagement with the rubber material on the adjacent side of said belt.

9. In an apparatus for forming rubber threads and the like, a continuously traveling belt adapted to convey rubber material on both sides thereof in sheet form, a pair of hollow mandrels rotatably mounted on opposite sides of said belt, a plurality of axially spaced knives secured to each of said mandrels and adapted to engage the rubber material on the adjacent sides of said belt, heating means disposed within said mandrels and adapted to heat said knives to a temperature sufficient to sever the rubber material, and means for rotating said mandrels in unison and at the same peripheral speed as the lineal speed of said belt.

10. In an apparatus for forming rubber threads and the like, a continuously traveling belt adapted to convey rubber material on both sides thereof in sheet form, a pair of hollow mandrels rotatably mounted on opposite sides of said belt, a plurality of axially spaced knives secured to each of said mandrels and adapted to engage the rubber material on the adjacent sides of said belt, heating means disposed within said mandrels and adapted to heat said knives to a temperature sufficient to sever the rubber material, means for rotating said mandrels in unison and at the same peripheral speed as the lineal speed of said belt, and means for moving one of said mandrels toward and away from said belt.

11. In an apparatus for forming rubber threads and the like, a continuously traveling belt adapted to convey rubber material on both sides thereof in sheet form, a pair of hollow mandrels rotatably mounted on opposite sides of said belt, a plurality of axially spaced knives secured to each of said mandrels and adapted to engage the rubber material on the adjacent sides of said belt, heating means disposed within said mandrels and adapted to heat said knives to a temperature sufficient to sever the rubber material, automatic means for controlling said heating means, and means for rotating said mandrels in unison and at the same peripheral speed as the lineal speed of said belt.

12. In an apparatus for forming rubber threads and the like, a continuously traveling belt adapted to convey rubber material on both sides thereof in sheet form, a pair of hollow mandrels rotatably mounted on opposite sides of said belt, a plurality of axially spaced knives secured to each of said mandrels and adapted to engage the rubber material on the adjacent sides of said belt, heating means disposed within said mandrels and adapted to heat said knives to a temperature sufficient to sever the rubber material, means for rotating said mandrels in unison and at the same peripheral speed as the lineal speed of said belt, and means for urging one of said mandrels toward the other to provide a predetermined pressure between said knives and the rubber material on said belt.

13. That method of forming rubber threads or the like from continuously moving strips of rubber material which comprises advancing a belt having a strip of rubber material upon each face thereof, and simultaneously separating both strips longitudinally into individual threads or strands in the absence of any shearing action by the progressive application of localized heat and pressure along each strip.

14. In an apparatus for forming rubber threads and the like, a continuously traveling belt adapted to convey rubber material on both sides thereof in sheet form, narrow disc-like severing knives rotatably mounted on opposite sides of said belt and adapted to engage the rubber material on the adjacent sides of said belt and to pass through the rubber material into backing engagement with said belt whereby the knives on one side of the belt act as backing means for the belt with respect to the other set of knives, and means for heating said knives to a temperature sufficient to sever the rubber material.

15. In an apparatus for forming rubber threads and the like, a continuously traveling belt adapted to convey rubber material on both sides thereof in sheet form, rotatable severing elements between which said belt passes and adapted to engage the rubber material on adjacent sides of said belt whereby said severing elements on one side of the belt act as backing means for the belt with respect to the severing elements on the other side thereof, and means for rotating said severing elements and advancing the belt with a rubber sheet upon each of its faces therebetween.

JOHN R. GAMMETER.